(12) United States Patent
Koesler et al.

(10) Patent No.: US 8,966,805 B2
(45) Date of Patent: Mar. 3, 2015

(54) REFLEX SIGHT

(75) Inventors: Paul D. Koesler, New Hudson, MI (US); Steven C. Szalony, Brighton, MI (US); Joshua Lee Varner, White Lake, MI (US); Joel M. Bagwell, Philadelphia, PA (US); Daniel M. Dillon, Tucson, AZ (US)

(73) Assignee: Trijicon, Inc., Wixom, MI (US)

( * ) Notice: Subject to any disclaimer, the term of this patent is extended or adjusted under 35 U.S.C. 154(b) by 284 days.

(21) Appl. No.: 13/587,190

(22) Filed: Aug. 16, 2012

(65) Prior Publication Data

US 2014/0237884 A1    Aug. 28, 2014

Related U.S. Application Data

(60) Provisional application No. 61/530,618, filed on Sep. 2, 2011.

(51) Int. Cl.
*F41G 1/38* (2006.01)
*F41G 1/34* (2006.01)
*F41G 1/30* (2006.01)
*G02B 23/10* (2006.01)

(52) U.S. Cl.
CPC ...... *F41G 1/345* (2013.01); *F41G 1/30* (2013.01); *G02B 23/105* (2013.01); *F41G 1/38* (2013.01)
USPC .................................. 42/119; 42/111; 42/113

(58) Field of Classification Search
CPC ............. F41G 1/345; F41G 1/38; F41G 1/30; G02B 23/105
USPC .................................................. 42/111–148
See application file for complete search history.

(56) References Cited

U.S. PATENT DOCUMENTS

| | | | |
|---|---|---|---|
| 3,963,356 A | 6/1976 | Wiklund | |
| 4,665,622 A | 5/1987 | Idan | |
| 4,764,011 A * | 8/1988 | Goldstein | 356/251 |
| 4,806,007 A * | 2/1989 | Bindon | 359/424 |
| 4,945,646 A | 8/1990 | Ekstrand | |
| 5,189,555 A | 2/1993 | Jorlov | |
| 5,373,644 A | 12/1994 | DePaoli | |
| 5,508,843 A | 4/1996 | Tomita | |
| 5,594,584 A | 1/1997 | Kay et al. | |
| 5,625,954 A | 5/1997 | DePaoli | |
| 5,653,034 A | 8/1997 | Bindon | |
| 5,924,234 A | 7/1999 | Bindon et al. | |

(Continued)

FOREIGN PATENT DOCUMENTS

DE    1 00 46 878 A1    2/2002
GB    2203606 A    10/1988

OTHER PUBLICATIONS

International Search Report and Written Opinion of the International Searching Authority regarding International Application No. PCT/US2012/052239, dated Feb. 13, 2013.

(Continued)

*Primary Examiner* — Samir Abdosh
(74) *Attorney, Agent, or Firm* — Harness, Dickey & Pierce, P.L.C.

(57) ABSTRACT

An optical sight is provided and may include a housing and a wedged, doublet objective lens supported by the housing. The wedged, doublet objective lens may include a first lens having a first amount of wedge and a second lens having a second amount of wedge different than the first amount of wedge.

18 Claims, 8 Drawing Sheets

(56) References Cited

U.S. PATENT DOCUMENTS

| | | | |
|---|---|---|---|
| 6,327,806 B1 | 12/2001 | Paige | |
| 6,516,551 B2 | 2/2003 | Gaber | |
| 6,519,889 B1 | 2/2003 | Schlierbach et al. | |
| 6,807,742 B2 | 10/2004 | Schick et al. | |
| 7,225,578 B2 | 6/2007 | Tai | |
| 7,325,354 B2 | 2/2008 | Grauslys et al. | |
| 7,676,981 B2 | 3/2010 | Buckingham et al. | |
| 7,706,065 B2 | 4/2010 | Regan et al. | |
| 7,832,137 B2 * | 11/2010 | Sammut et al. | 42/111 |
| 7,916,290 B2 | 3/2011 | Koehler | |
| 8,009,958 B1 | 8/2011 | Schick et al. | |
| 8,166,698 B2 | 5/2012 | Raviv et al. | |
| 2005/0021282 A1 * | 1/2005 | Sammut et al. | 702/150 |
| 2007/0234626 A1 * | 10/2007 | Murdock et al. | 42/126 |
| 2008/0098640 A1 * | 5/2008 | Sammut et al. | 42/122 |
| 2009/0235570 A1 * | 9/2009 | Sammut et al. | 42/122 |
| 2010/0083554 A1 | 4/2010 | Elpedes et al. | |
| 2010/0095578 A1 | 4/2010 | Elpedes et al. | |
| 2011/0035980 A1 | 2/2011 | Raviv et al. | |
| 2012/0030985 A1 * | 2/2012 | Mauricio et al. | 42/84 |
| 2012/0151816 A1 * | 6/2012 | Kleck et al. | 42/132 |
| 2014/0109459 A1 * | 4/2014 | Sammut et al. | 42/122 |

OTHER PUBLICATIONS

Extended European Search Report for Application No. EP 12 82 6952 dated Dec. 18, 2014 (7 pages).

* cited by examiner

REFLEX SIGHT

CROSS-REFERENCE TO RELATED APPLICATIONS

This application claims the benefit of U.S. Provisional Application No. 61/530,618, filed on Sep. 2, 2011. The entire disclosure of the above application is incorporated herein by reference.

FIELD

The present disclosure relates to optical sights and more particularly to a reflex sight.

BACKGROUND

This section provides background information related to the present disclosure which is not necessarily prior art.

Optical sights are typically used in conjunction with a firearm to aid a shooter in properly aligning a barrel of the firearm with a desired target. Properly aligning the barrel of the firearm relative to a target results in a projectile fired from the firearm impacting the target at a desired location. Conventional optical sights are typically mounted at a top surface of the firearm and include an aiming point for use by the shooter in aligning the optical sight and, thus, the barrel of the firearm relative to the target. Such aiming points may be illuminated to further aid a shooter in quickly and accurately aligning the optical sight and firearm relative to a target.

Optical sights may be used in conjunction with a variety of firearms and, as such, may provide different features depending on the particular firearm and/or application. For example, an optical sight mounted on a rifle for use by a sniper is typically configured to provide increased magnification of a target to allow the shooter to be positioned at a location far away from the target. Such optical sights are typically somewhat lengthy to accommodate an optics train that is capable of adequately magnifying a target. Further, such optical sights are typically designed for use by a shooter that has sufficient time to properly align the optical sight and firearm relative to a target.

Other optical sights are designed for use in close-target situations and are therefore compact and designed to allow a shooter to quickly train the optical sight and firearm on a target. One such optical sight is a so-called reflex sight that is useful in close-target situations by providing the shooter with fast-target acquisition and aiming of a firearm. Such reflex sights are typically more compact than an optical sight used on a sniper rifle, for example, to allow mounting of other systems on the firearm (i.e., laser pointers, ranging devices, etc.) and to reduce the overall size and weight of the combined firearm and optical sight. Further, such reflex sights provide a field-of-view that allows the shooter to quickly position the optical sight and firearm relative to a target without reducing the situational awareness of the shooter.

While conventional reflex sights adequately provide an aiming point for use by a shooter in aligning a firearm relative to a target, conventional reflex sights cannot provide a large field-of-view (i.e., having a clear aperture diameter greater than approximately 22 millimeters), as doing so typically requires an optics train associated with the reflex sight to be lengthy, thereby increasing the overall size of the reflex sight. The lengthy optics train is required to provide an optical path having a long focal length to minimize parallax with customary spherical lenses. Reflex sight manufacturers therefore strive to balance the desire to have a compact reflex sight with the desire to provide a large field-of-view, all while minimizing parallax.

In addition to the foregoing constraints with respect to the size of the field-of-view, overall size and shape of the reflex sight, and the amount of parallax, conventional reflex sights typically require one or more batteries to constantly power an illumination device associated with the reflex sight. The power supplied to the illumination device is used to illuminate an aiming point and typically comes from one or more batteries. Because conventional reflex sights typically incorporate only a single power source (i.e., one or more batteries) in constant use, conventional reflex sights require a shooter to frequently change the batteries of the sight, which is often difficult in a combat or other law-enforcement situation.

SUMMARY

This section provides a general summary of the disclosure, and is not a comprehensive disclosure of its full scope or all of its features.

An optical sight is provided and may include a housing and a wedged, doublet objective lens supported by the housing. The wedged, doublet objective lens may include a first lens having a first amount of wedge and a second lens having a second amount of wedge different than the first amount of wedge.

In another configuration, an optical sight is provided and may include a housing having a bore and an optics train, whereby the optics train cooperates with the housing to define an interior volume. A port may be in fluid communication with the interior volume via the bore. A sealing member may be disposed within the port and may permit a tool to pass through the sealing member to insert or evacuate fluid from the interior volume via the bore and to automatically seal the port upon removal of the tool.

In another configuration, an optical sight is provided and may include a housing, an optics train supported by the housing, and an illumination device that selectively displays an aiming point on the optics train. A power source having a photovoltaic cell and a battery may selectively supply power from at least one of the photovoltaic cell and the battery to the illumination device for use by the illumination device in generating the aiming point. The illumination device provides as much power as available from the photovoltaic cell prior to providing supplementary power from the battery.

In another configuration, an optical sight is provided and may include a housing having a longitudinal axis, an optics train supported by the housing and including a least one lens, and a first collar disposed within the housing that is selectively movable relative to the housing along the longitudinal axis. The first collar may move the at least one lens relative to the housing to adjust a position of the at least one lens along the longitudinal axis when the first collar is moved relative to the housing.

In another configuration, an optical sight is provided and may include a housing, at least one optic supported by the housing, and an illumination device operable to direct light toward the at least one optic in a direction substantially perpendicular to the at least one optic to generate an aiming point. The optical sight may also include an adjuster block that supports the illumination device within the housing and is movable relative to the housing in a first direction substantially parallel to the at least one optic.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
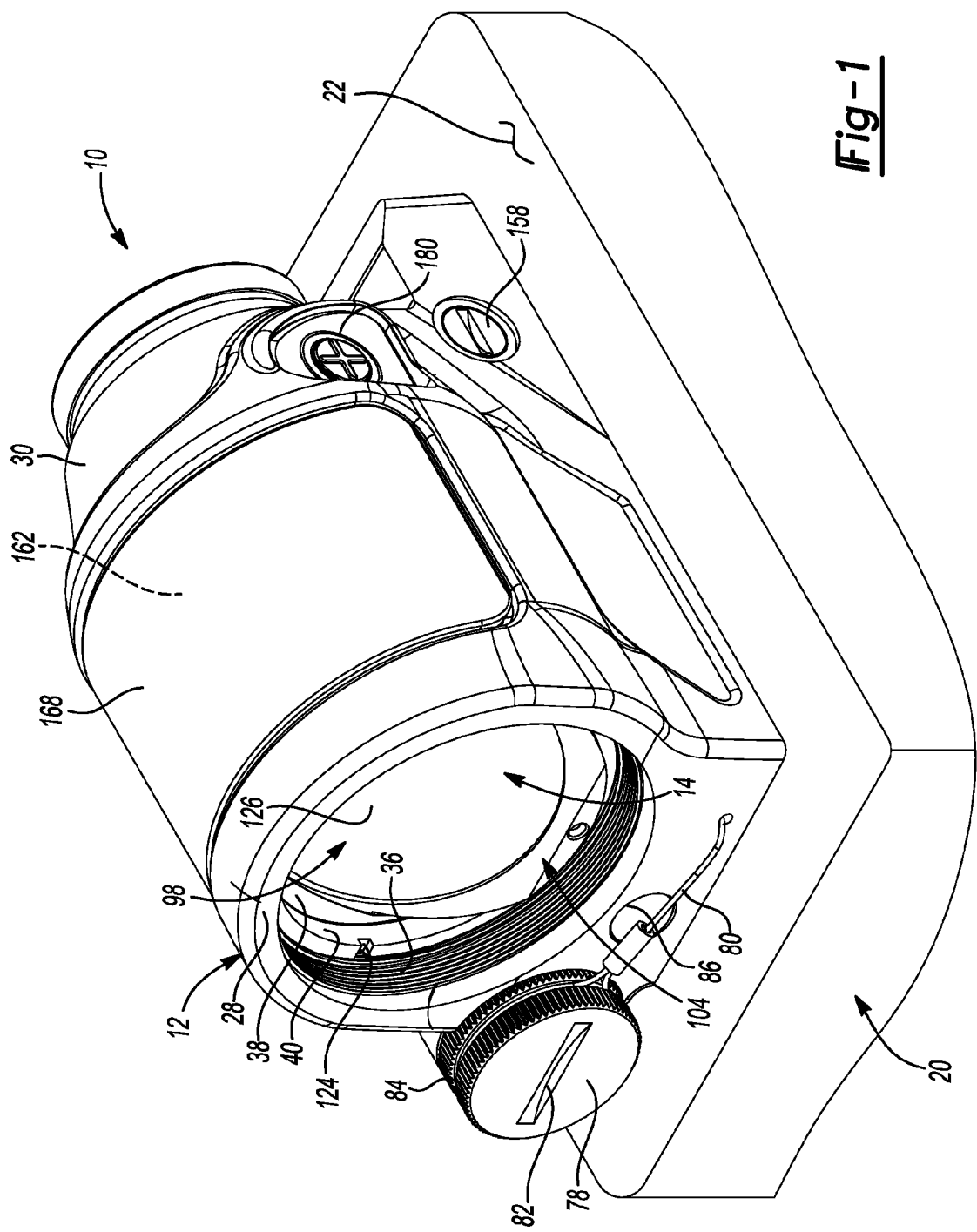
FIG. 1 is a perspective view of a reflex sight in accordance with the principles of the present disclosure mounted to a firearm.
Figure 2:
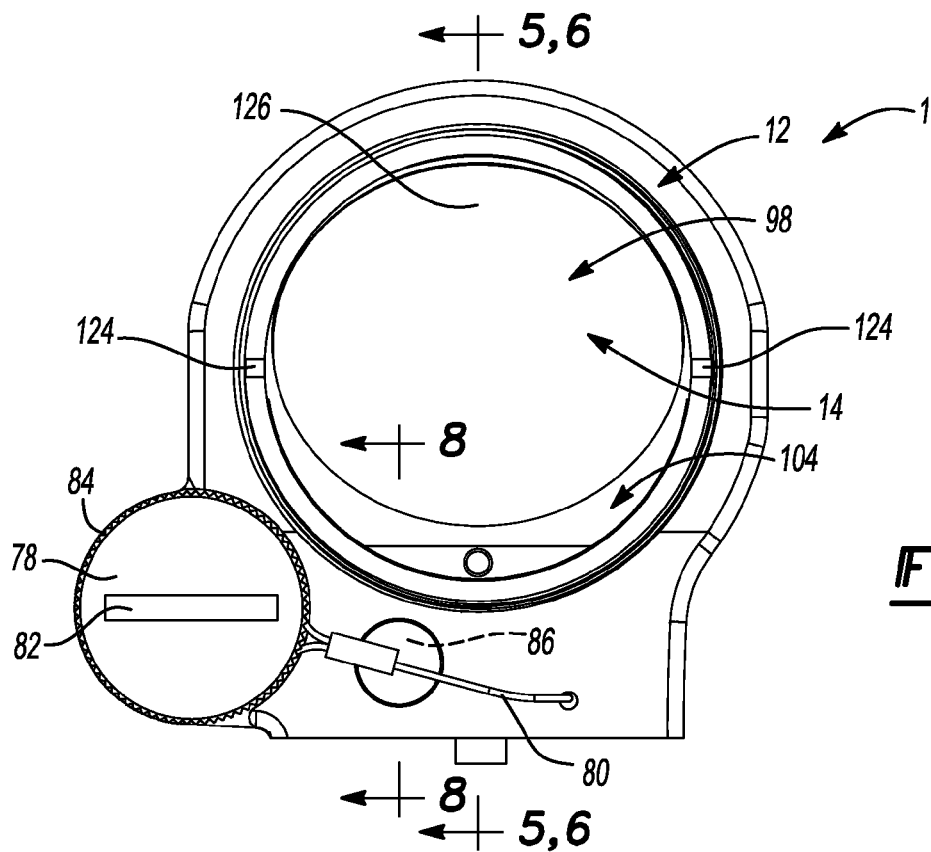
FIG. 2 is a front view of the reflex sight of FIG. 1.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of moded features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to the figures, a reflex sight 10 is provided and may include a housing 12, an optics train 14, an illumination system 16, and an adjustment mechanism 18. The housing 12 may support the optics train 14, illumination system 16, and adjustment mechanism 18 relative to a firearm 20 (FIG. 1) to allow the optics train 14, illumination system 16, and adjustment mechanism 18 to be disposed proximate to a top surface 22 of the firearm 20. The illumination system 16 may cooperate with the optics train 14 to provide an illuminated aiming point 24 (FIG. 3) to aid a shooter in properly aligning the reflex sight 10 with a target (not shown). The adjustment mechanism 18 may be used to selectively adjust a position of the illumination system 16 relative to the housing 12 and, thus, a position of the illuminated aiming point 24 within a field-of-view 26 (FIG. 3) of the reflex sight 10 when the reflex sight 10 is initially installed on the firearm 20.

The housing 12 may include a first end 28, a second end 30, and an interior volume 32 defined generally between the first end 28 and the second end 30. The housing 12 may additionally include a series of threads 34 extending at least partially between the first end 28 and the second end 30. The first end 28 may include a series of threads 36 and may receive a first collar 38 and threadably receive a second collar 40. Likewise, the second end 30 may include a series of threads 42 that threadably receive a collar 44. As will be described in detail below, the first collar 38 and the second collar 40 associated with the first end 28 of the housing 12 and the collar 44 associated with the second end 30 of the housing 12 cooperate to retain and position respective components of the optics train 14 relative to the housing 12.

The housing 12 may additionally include an extension 46 having a cavity 48 and an aperture 50 formed through a back-angled surface 52 of the extension 46. The cavity 48 and aperture 50 may cooperate to retain and position the adjustment mechanism 18 relative to the housing 12 while concurrently allowing the adjustment mechanism 18 to selectively adjust a position of the illumination system 16 relative to the housing 12 and optics train 14.

The housing 12 may include an opening 54 proximate to a bottom surface 56 of the housing 12 that opposes the top surface 22 of the firearm 20 once installed. The opening 54 may receive a portion of the illumination system 16 therein and may be in communication with the cavity 48 of the extension 46 to permit installation of the adjustment mechanism 18 during assembly. Once the illumination system 16 and adjustment mechanism 18 are properly installed in the housing 12, a cover 58 may be attached to the housing 12 via a series of fasteners 60.

Seals 62 may be positioned generally between the cover 58 and the bottom surface 56 of the housing 12 prior to attachment of the cover 58 to the housing 12, whereby the seals 62 is disposed within pockets 64 formed into the bottom surface 56 of the housing 12. Once the seals 62 are seated within the pockets 64 of the housing 12, the fasteners 60 may be inserted into apertures 66 of the cover 58 and may be threadably received within apertures 68 (not shown) of the housing 12 to secure the cover 58 to the housing 12.

Figure 5:
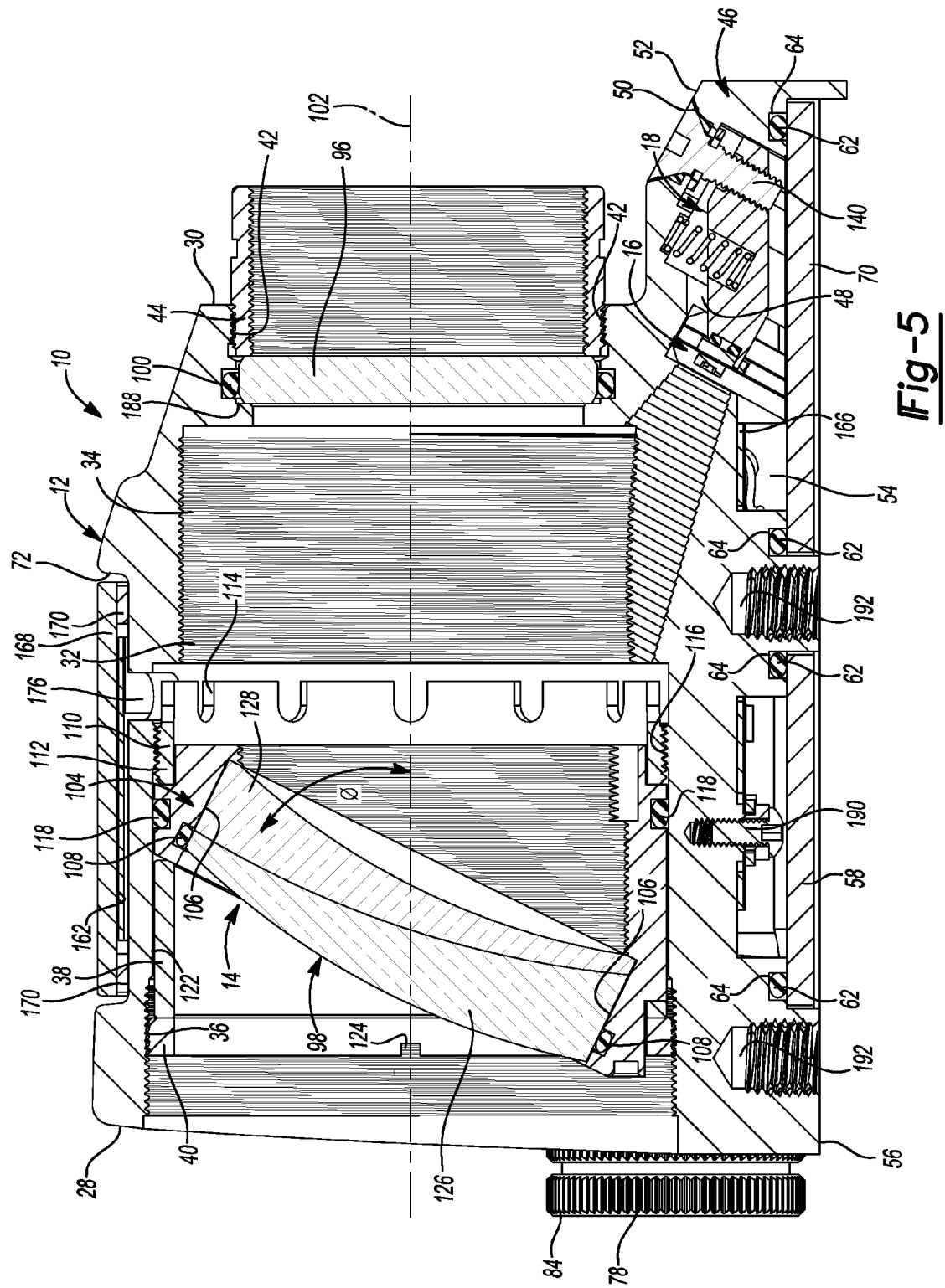
FIG. 5 is a cross-sectional view of the reflex sight of FIG. 1 taken along line 5-5 of FIG. 2.
Figure 6:
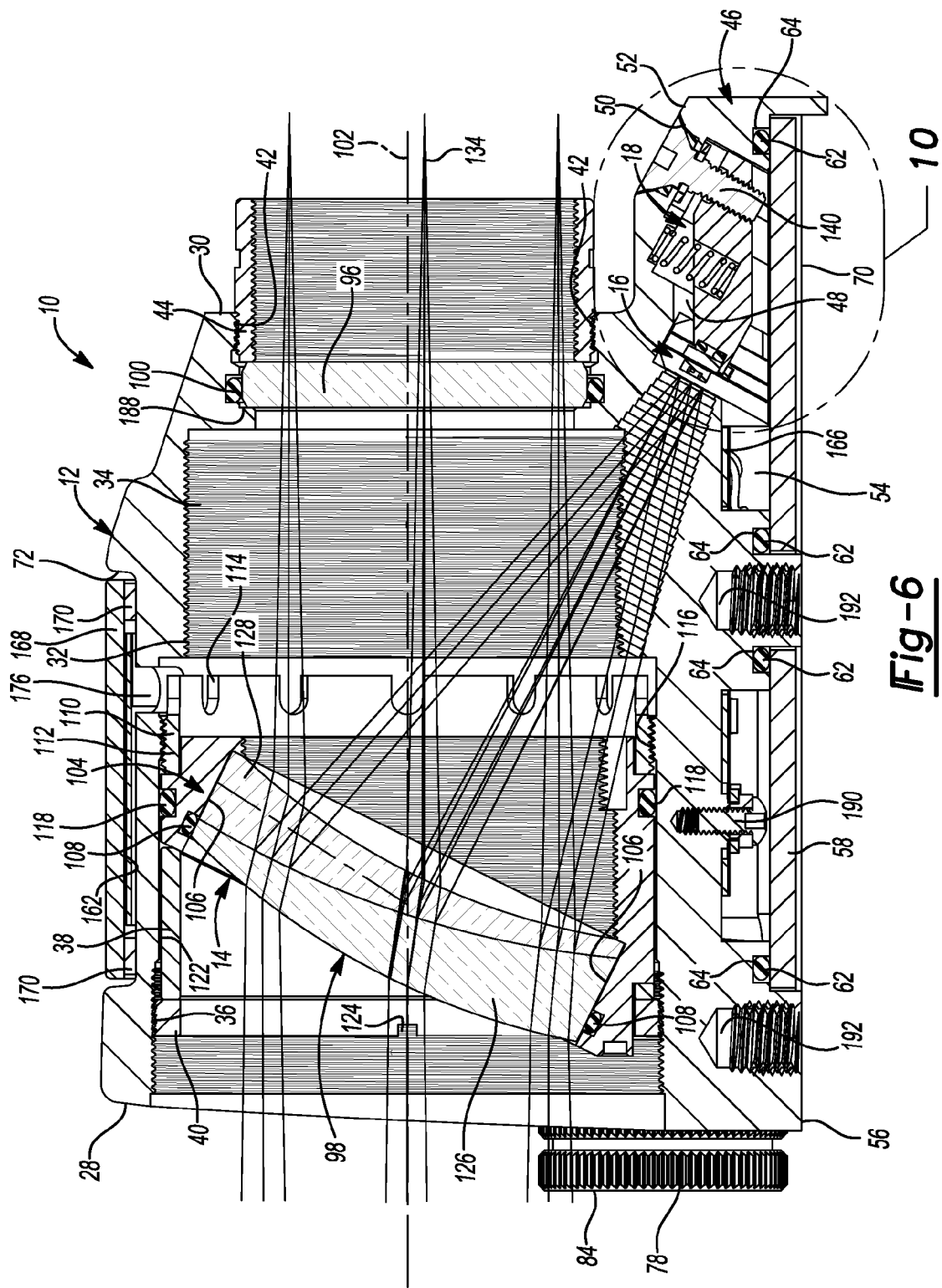
FIG. 6 is a cross-sectional view of the reflex sight taken along line 6-6 of FIG. 2 illustrating an optical path of the reflex sight.
Figure 10:
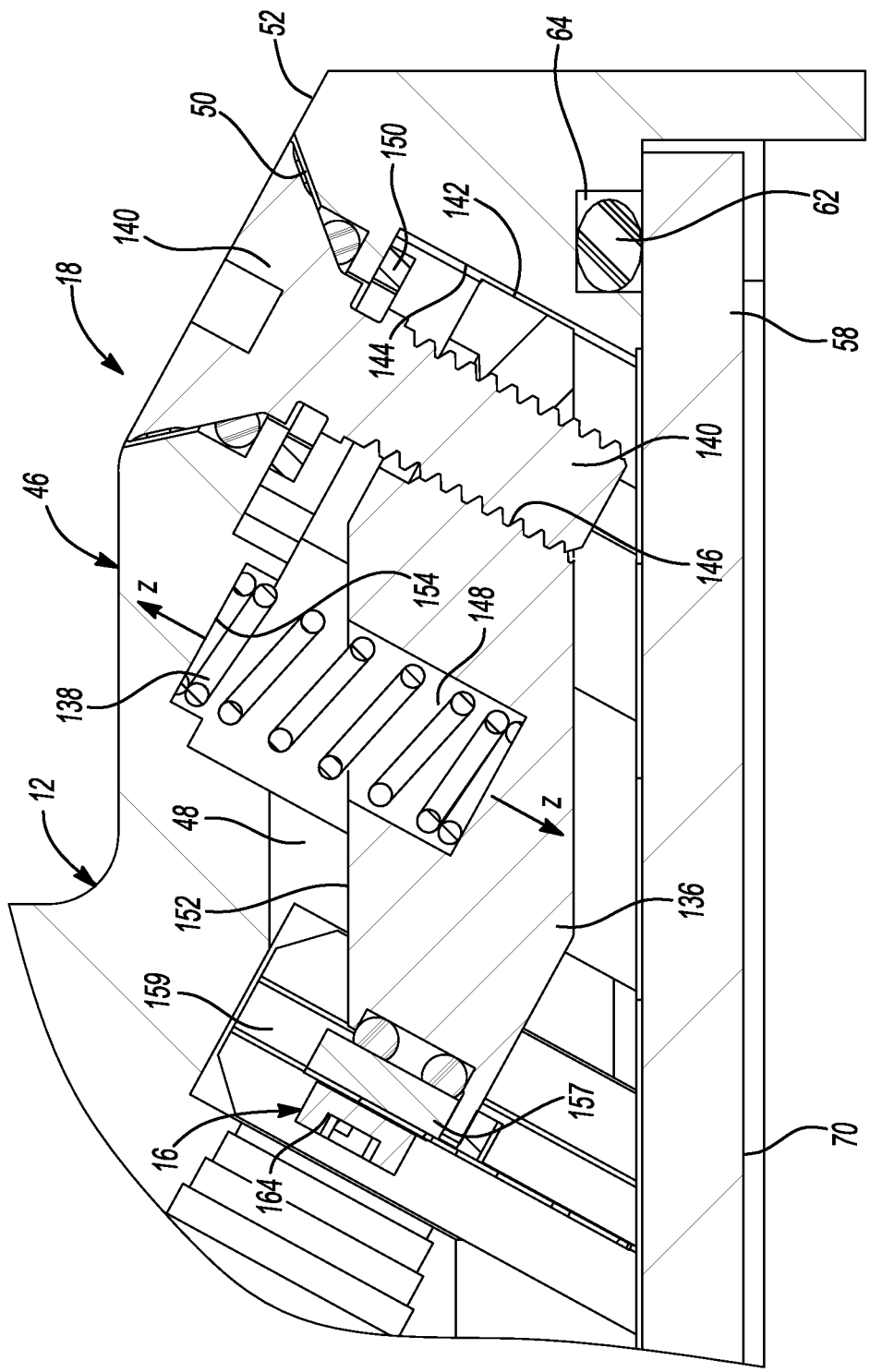
FIG. 10 is a partial cross-sectional view of the reflex sight of FIG. 1 detailing an adjustment mechanism of the reflex sight.

Rotation of the fasteners 60 relative to the cover 58 and apertures 68 (not shown) of the housing 12 may cause the cover 58 to move generally toward the housing 12 to compress the seals 62 between the cover 58 and the housing 12. The fasteners 60 may be driven until the seals 62 is sufficiently compressed and/or a surface 70 of the cover 58 is substantially flush with the bottom surface 56 of the housing 12, as shown in FIGS. 5 and 6. While the surface 70 of the cover 58 is described as being substantially flush with the bottom surface 56 of the housing 12, the surface 70 of the cover 58 could protrude or be recessed from the bottom surface 56 of the housing 12. For example, the surface 70 may be slightly recessed from the bottom surface 56 of the housing 12, as shown in FIG. 10, to allow sufficient compression of the seals 62 and to prevent the cover 58 from causing the housing 12 to unnecessarily extend farther from the top surface 22 of the firearm 20 than is required.

The housing 12 may include a recess 72 that receives a portion of the illumination system 16 therein and a substantially cylindrical bore 74 (FIGS. 3 and 7) that receives a substantially cylindrical battery 76. A cap 78 may be tethered to the housing 12 via a cable 80 and may be threadably attached to the cylindrical bore 74 once the battery 76 is positioned therein. Specifically, a tool (not shown) may engage a slot 82 and/or a force may be applied to a series of ribs 84 of the cap 78 to rotate and attach the cap 78 to the housing 12 at the cylindrical bore 74 to retain the battery 76 within the cylindrical bore 74.

Figure 8:
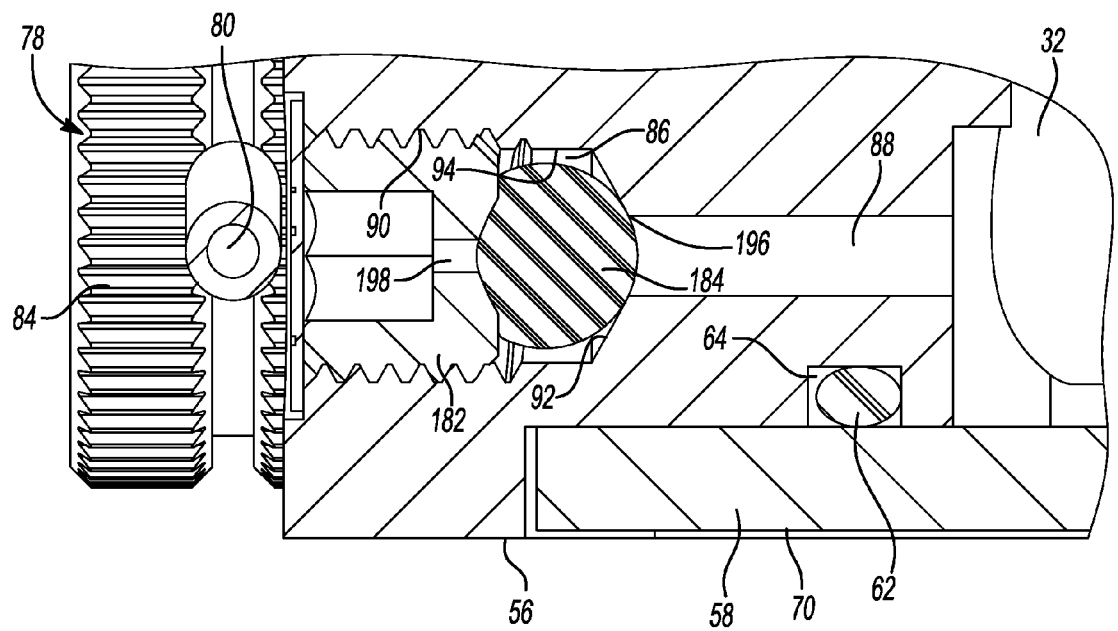
FIG. 8 is a partial cross-sectional view of the reflex sight of FIG. 1 taken along line 8-8 of FIG. 2.

A port 86 may be disposed adjacent to the cylindrical bore 74 and may be in fluid communication with the interior volume 32 of the housing 12 via a bore 88 (FIG. 8) formed in the housing 12. The bore 88 may extend generally between the port 86 and the interior volume 32 to permit the port 86 to be in communication with the interior volume 32. The port 86 may include a threaded portion 90, a substantially tapered end 92, and a substantially cylindrical portion 94 extending between the threaded portion 90 and the tapered end 92.

With particular reference to FIGS. 5 and 6, the optics train 14 is shown to include an eyepiece lens 96 disposed proximate to the second end 30 of the housing 12 and a wedged, doublet objective lens 98 disposed proximate to the first end 28 of the housing 12. The wedged, doublet objective lens 98 may be a spherical lens or an aspherical lens.

The eyepiece lens 96 may be received at the second end 30 of the housing 12 and may be sealed relative to the housing 12 via a seal 100. Once installed in the housing 12 and engaged with the seal 100, the collar 44 may engage the threads 42 of the housing 12 until the collar 44 abuts the eyepiece lens 96. A rotational force may be applied to the collar 44 to allow the collar 44 to move along a longitudinal axis 102 of the housing 12 until the collar 44 contacts the eyepiece lens 96. Once the collar 44 engages the eyepiece lens 96, the eyepiece lens 96 is properly installed in the housing 12 and is retained therein by the collar 44.

The wedged, doublet objective lens 98 may be received within a housing 104 that supports the wedged, doublet objective lens 98 relative to the housing 12. The housing 104 may include an angled cylinder having an inner surface 106 (FIGS. 5 and 6) that positions the wedged, doublet objective lens 98 at a desired angle (⊖) relative to the longitudinal axis 102 of the housing 12. The wedged, doublet objective lens 98 may be sealed relative to the housing 104 via a seal 108 that may be disposed generally between the inner surfaces 106 and the wedged, doublet objective lens 98. Once the wedged, doublet objective lens 98 is assembled to the housing 104, the housing 104 and wedged, doublet objective lens 98 are ready to be installed in the housing 12.

Prior to installation of the housing 104 and wedged, doublet objective lens 98, an adjustment collar 110 having an external threaded portion 112 and a series of keyed openings 114 is first installed in the housing 12. Specifically, the adjustment collar 110 may be inserted into the housing 12 at the first end 28 and may engage a series of threads 116 of the housing 12.

The housing 104 and wedged, doublet objective lens 98 may be inserted into the housing 12 at the first end 28 following installation of the adjustment collar 110. Specifically, a seal 118 (FIGS. 5 and 6) may be received within a groove 120 (FIG. 7) of the housing 104 and may engage an inner surface 122 of the housing 12 to seal an interface of the housing 104 and the housing 12. The housing 104 may be inserted generally into the housing 12 at the first end 28 and may be translated within the housing 12 generally toward the adjustment collar 110 in a direction substantially parallel to and along the longitudinal axis 102 of the housing 12.

Once the housing 104 is installed, the first collar 38 may be inserted into the first end 28 of the housing 12 until the first collar 38 abuts the housing 104. At this point, the second collar 40 may engage the threads 36 of the housing 12 and may be rotated relative to the housing 12 until the second collar 40 engages the first collar 38 to retain the first collar 38 and, thus, the housing 104 in a desired position relative to the housing 12. Specifically, a force may be applied to a series of cutouts 124 (FIG. 7) of the second collar 40 to facilitate application of a rotational force to the second collar 40. The second collar 40 may be rotated relative to the housing 12 until the second collar 40 sufficiently forces the first collar 38 in a direction substantially parallel to and along the longitudinal axis 102 and into engagement with the housing 104. The housing 104 and, thus, the wedged, doublet objective lens 98 is held in a desired position along the longitudinal axis 102 of the housing 12 due to engagement between the housing 104 and the first collar 38 in conjunction with engagement between the first collar 38 and the second collar 40.

Figure 9:
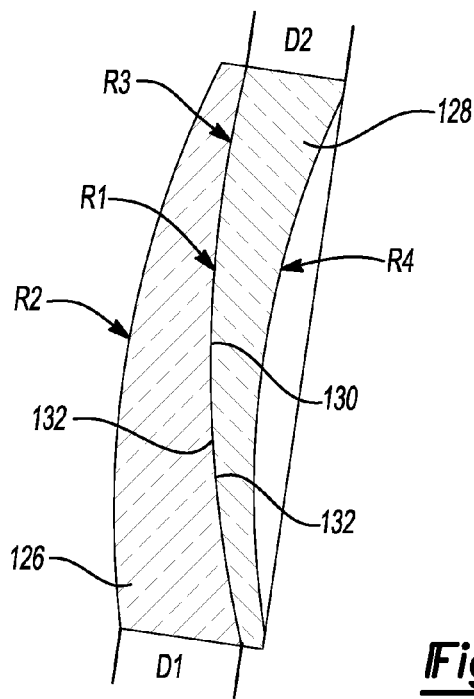
FIG. 9 is a sectional view of a portion of an optics train of the reflex sight of FIG. 1.

With particular reference to FIG. 9, the wedged, doublet objective lens 98 includes a first lens 126 and a second lens 128. The first lens 126 may be joined to the second lens 128 via a suitable adhesive 130. For example, the first lens 126 may be joined to the second lens 128 via an optically-clear cement. Prior to assembly of the first lens 126 to the second lens 128, a reflective coating 132 may be applied to the first lens 126 and/or to the second lens 128 at a junction of the first lens 126 and the second lens 128. The reflective coating 132 may cooperate with the illumination system 16 to generate the illuminated aiming point 24. Specifically, the spectral output of the illumination system 16 may overlap with a selective spectral reflectance of the reflective coating applied to one or both of the first lens 126 and second lens 128 at the junction of the first lens 126 and the second lens 128 to permit the light generated by the illumination system 16 to project off of the reflective coating 132 and generate the illuminated aiming point 24 such that the illuminated aiming point 24 appears to originate from a specified target distance so as to minimize parallax.

The first lens 126 may include a wedge having a width (D1). Similarly, the second lens 128 may include a wedge having a width (D2) disposed generally at an opposite end of the wedged, doublet objective lens 98 than the wedge of the first lens 126. The width (D1) of the first lens 126 may be different than the width (D2) of the second lens 128 or, alternatively, the width (D1) of the first lens 126 may be the same as the width (D2) of the second lens 128. Regardless of whether the first lens 126 and the second lens 128 include a different width (D1, D2), the first lens 126 and the second lens 128 include a different amount of wedge, which may be accomplished by having different angles and/or having different edge thicknesses.

The first lens 126 includes an inner radius (R1) and an outer radius (R2). Similarly, the second lens 128 includes an outer radius (R3) and an inner radius (R4). Once assembled, the inner radius (R1) of the first lens 126 opposes the outer radius (R3) of the second lens 128. The inner radius (R1) of the first lens 126 is the same as the outer radius (R3) of the second lens 128 to allow the first lens 126 to be properly attached to the second lens 128 at the inner radius (R1) and the outer radius (R3). While the inner radius (R1) and the outer radius (R3) are the same, the outer radius (R2) of the first lens 126 and the inner radius (R4) of the second lens 128 may include a different radii of curvature to help minimize parallax and to help minimize the optical or focusing power of the wedged, doublet objective lens 98. Further, the lenses 126, 128 may have different refractive indices. The different refractive indices may be accomplished by manufacturing the lenses 126, 128 out of different materials each having a different refractive index. Once the housing 104 and wedged, doublet objective lens 98 are installed in the housing 12, the first lens 126 and the second lens 128 are positioned at an angle (Θ) relative to the optical axis 134.

With particular reference to FIGS. 5, 6, and 10, the adjustment mechanism 18 is shown to include an adjuster block 136, a biasing element 138, and an adjustment screw 140. The adjuster block 136, biasing element 138, and adjustment screw 140 may be disposed within the cavity 48 of the extension 46 and may selectively position a portion of the illumination system 16 relative to the housing 12. Specifically, the adjuster block 136 may be positioned within the cavity 48 such that a tapered surface 142 of the adjuster block 136 opposes a tapered surface 144 of the housing 12 to define a direction of motion of the adjuster block 136 relative to the housing 12 and/or to support the adjuster block 136 relative to the housing 12. The adjuster block 136 may include a threaded aperture 146 that threadably receives the adjustment screw 140 therein. A pocket 148 may be disposed adjacent to the threaded aperture 146 and may receive a portion of the biasing element 138 therein.

The adjustment screw 140 is inserted into the aperture 50 formed in the back-angled surface 52 of the extension 46. Specifically, the adjustment screw 140 is inserted into the aperture 50 and may be retained therein via a snap-ring 150. The snap-ring 150 retains the adjustment screw 140 within the aperture 50 while concurrently allowing the adjustment screw 140 to rotate relative to the aperture 50.

As described above, the biasing element 138 is at least partially received within the pocket 148 of the adjuster block 136. As such, the biasing element 138 extends generally from a top surface 152 of the adjuster block 136 and is received within a recess 154 of the housing 12. The biasing element 138 is therefore retained at one end by the pocket 148 of the adjuster block 136 and is retained at a second end by the recess 154 of the housing 12. The biasing element 138 exerts a force on the adjuster block 136 in a direction (Z) that is substantially parallel to the tapered surface 142 of the adjuster block 136 and the tapered surface 144 of the housing 12. The biasing element 138 serves to maintain a force on the adjuster block 136 in the direction (Z) to aid in maintaining an adjusted position of the adjuster block 136 in the direction (Z) once a desired position of the adjustment screw 140 relative to the housing 12 is achieved.

The adjuster block 136 may be slidably attached to a portion of the illumination system 16 to allow the adjuster block 136 to adjust a position of the illumination system 16 when the adjuster block 136 is moved along the direction (Z). Specifically, the adjuster block 136 may be slidably attached to a support plate 157 of the illumination system 16 such that movement of the adjuster block 136 in the direction (Z)—via a rotational force applied to the adjustment screw 140—causes concurrent movement of the support plate 157 in the direction (Z).

A pair of slider blocks 156 may be slidably attached to the support plate 157 to permit the support plate 157 to move in the direction (Z) when the adjuster block 136 is moved in the direction (Z). Interaction between the slider blocks 156 and the support plate 157 may additionally serve to guide movement of the support plate 157 and, thus, the adjuster block 136 in the direction (Z) when a rotational force is applied to the adjustment screw (140).

Figure 3:
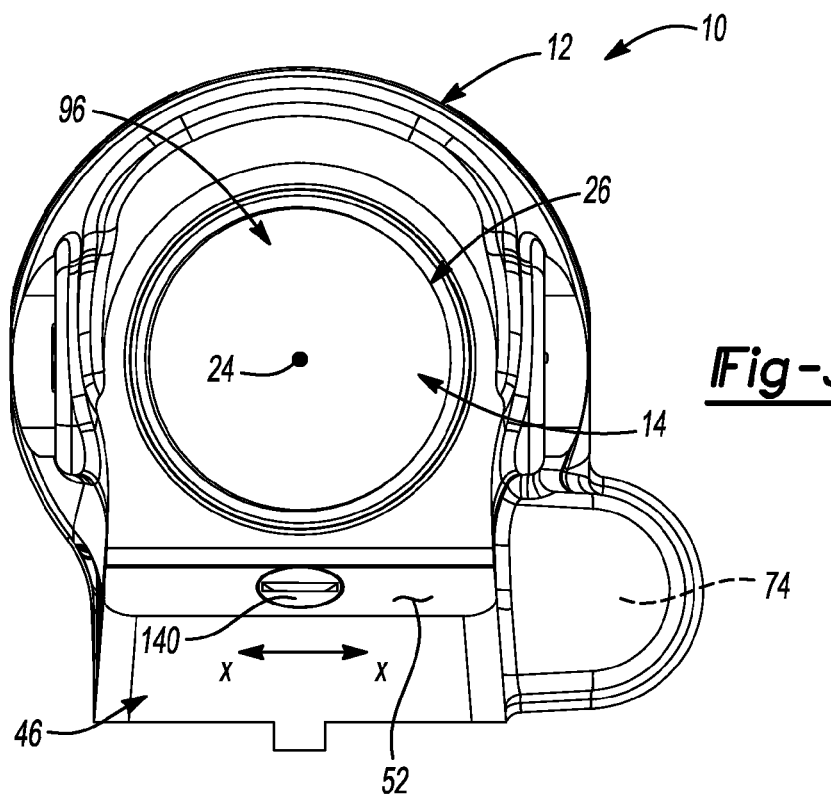
FIG. 3 is a rear view of the reflex sight of FIG. 1.
Figure 4:
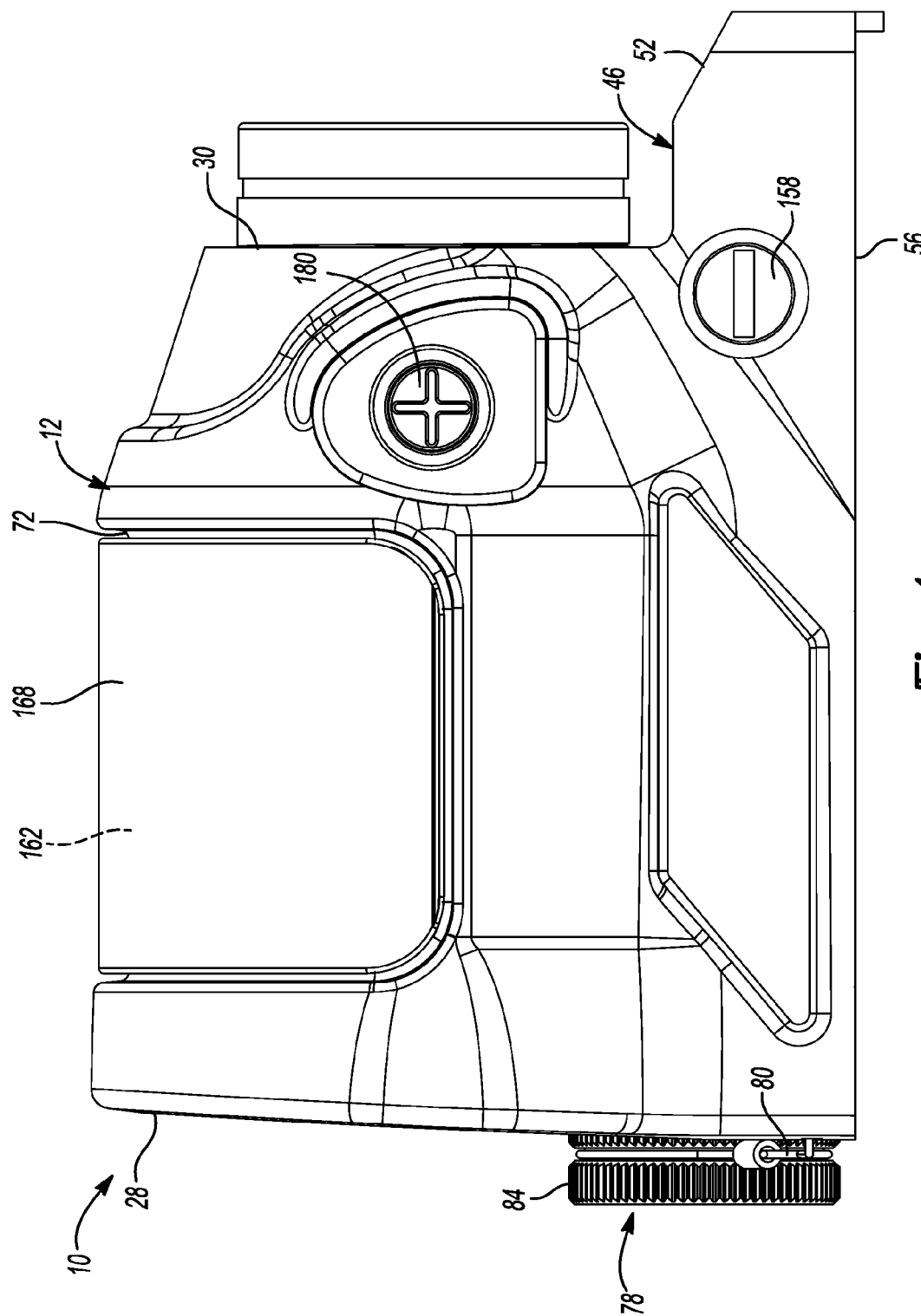
FIG. 4 is a side view of the reflex sight of FIG. 1.

The slider blocks 156 may cooperate with an adjustment screw 158 and a biasing element 160 to adjust a position of the illumination system 16 in a direction (X), as shown in FIG. 3. Specifically, rotation of the adjustment screw 158 relative to the housing 12 exerts a force on one of the slider blocks 156, which transmits the applied force to the support plate 157. Because the support plate 157 is held in contact with both slider blocks 156 within a channel 159 of each slider block 156 (FIG. 10)—due to the biasing force exerted thereon by the biasing element 160—movement of one of the slider blocks 156 caused by rotation of the adjustment screw 158 causes concurrent movement of the other slider block 156 and the support plate 157. Movement of the support plate 157 in the direction (X) causes adjustment of the illumination system 16 in the direction (X), as will be described in greater detail below.

Figure 7:
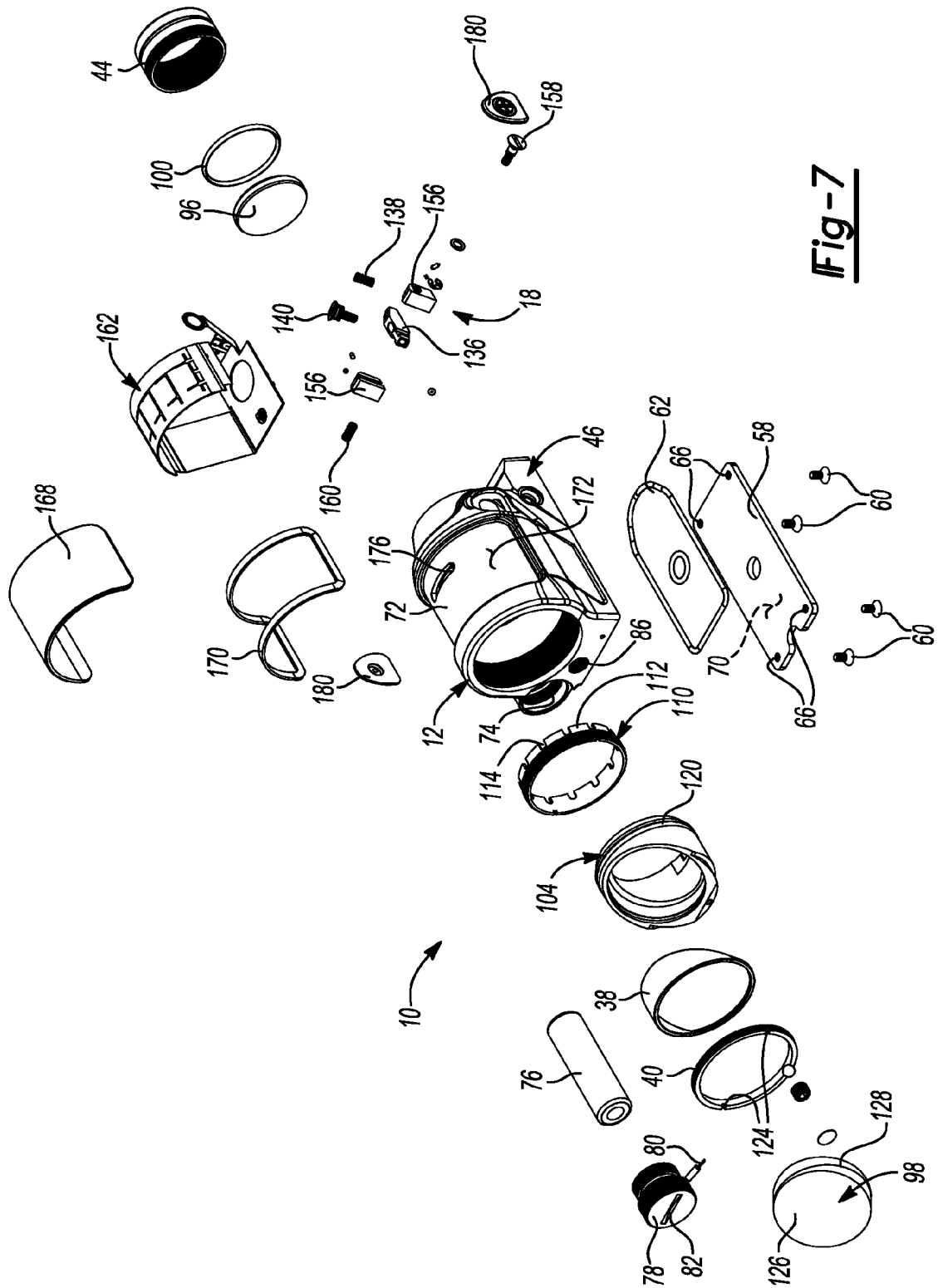
FIG. 7 is an exploded view of the reflex sight of FIG. 1.

With particular reference to FIGS. 5, 7, and 10, the illumination system 16 is shown to include a photovoltaic cell 162, a light-emitting diode (LED) 164, and a controller 166. The photovoltaic cell 162 may be positioned proximate to the top of the housing 12 and may be disposed generally within the recess 72. The photovoltaic cell 162 may harness energy from ambient light generally surrounding the housing 12 and may convert the light energy into electrical energy for powering the LED 164. The photovoltaic cell 162 may be disposed within the recess 72 and may include a cover 168 that protects the photovoltaic cell 162 during use. The cover 168 may be formed from a substantially optically clear material that permits sunlight to enter the recess 72 and be received by the photovoltaic cell 162. The photovoltaic cell 162 may be sealed from ambient conditions via a seal 170 disposed generally between the cover 168 and a bottom surface 172 of the recess 72.

The photovoltaic cell 162 may be the primary and default power source for the LED 164 and the battery 76 may be the secondary or backup power source. In other words, power is first supplied to the LED 164 from the photovoltaic cell 162 prior to supplying power from the battery 76. While the battery 76 may likewise supply power to the LED 164 in conjunction with or in place of the photovoltaic cell 162, power from the battery 76 may only be used when power from the photovoltaic cell 162 is insufficient to illuminate the LED 164 at a desired brightness.

The LED 164 may be supported by the support plate 157 such that movement of the support plate 157 relative to the housing 12 likewise causes movement of the LED 164 relative to the housing 12. Specifically, the LED 164 may be attached to the support plate 157 at an opposite end of the adjuster block 136 than the tapered surface 142 and is fixed for movement with the adjuster block 136 in the direction (Z). As such, when the adjustment screw 140 is rotated relative to the housing 12, thereby causing movement of the adjuster block 136 and support plate 157 relative to the housing 12 in the direction (Z), the LED 164 is likewise moved relative to the housing 12 in the direction (Z). Further, because the support plate 157 is slidably attached to the adjuster block 136 allowing for movement of the support plate 157 in the direction (X) when the adjustment screw 158 is rotated relative to the housing 12, rotation of the adjustment screw 158 causes movement of the LED 164 in the direction (X).

Movement of the LED 164 relative to the housing 12 likewise causes the light output of the LED 164 to move relative to the housing 12 and contact the reflective coating 132 of the wedged, doublet objective lens 98 at a different location. Contacting the reflective coating 132 at a different location changes the position of the illuminated aiming point 24 within the field-of-view 26 and permits a shooter to calibrate the illuminated aiming point 24 relative to a particular firearm 20, ammunition, and target range.

While the LED 164 is described and shown as being attached to the support plate 157 such that the LED 164 moves with the support plate 157 in the direction (Z) and the direction (X) relative to the housing 12, the LED 164 is always positioned at a location outside of the field-of-view 26 regardless of the position of the support plate 157. As a result, light from the LED 164 must travel substantially perpendicular to the angle (Θ) of the tilt of the wedged, doublet objective lens 98 to permit light from the LED 164 to travel along the optical axis 134 and generate the illuminated aiming point 24 within the field-of-view 26.

The controller 166 may be received generally at a bottom portion of the housing 12 and within the opening 54. The controller 166 may be in communication with each of the battery 76, photovoltaic cell 162, LED 164, and buttons 180. As will be described in greater detail below, the controller 166 may control the brightness of the illuminated aiming point 24 by controlling the amount of power supplied to the LED 164 based on a user input.

With particular reference to FIGS. 5-8, assembly, installation, and operation of the reflex sight 10 will be described in detail. During assembly, the adjustment collar 110 is received within the housing 12 at the first end 28 and engages the threads 116 disposed generally within the interior volume 32 of the housing 12. A rotational force may be applied to the adjustment collar 110 to rotate the adjustment collar 110 relative to the housing 12, thereby causing the adjustment collar 110 to translate in a direction substantially parallel to and along the longitudinal axis 102 of the housing 12. The rotational force may be applied to the adjustment collar 110 at the keyed openings 114 of the adjustment collar 110 to facilitate rotation of the adjustment collar 110 relative to the housing 12.

Access to the keyed openings 114 may be accomplished via a groove 176 formed in the bottom surface 172 of the recess 72. Specifically, a tool (not shown) may be inserted into the groove 176 and may engage the keyed openings 114 of the adjustment collar 110 to apply a rotational force on the adjustment collar 110, thereby causing the adjustment collar 110 to rotate and translate relative to the housing 12 and into a desired position. Once the adjustment collar 110 is in a desired position relative to the housing 12, the tool may be removed from the groove 176.

The housing 104 may be inserted into the housing 12 at the first end 28 following insertion of the adjustment collar 110. Because the housing 104 supports the wedged, doublet objective lens 98, the lens 98 is likewise inserted along with the housing 104 into the housing 12 at the first end 28. The housing 104 may be translated along the longitudinal axis 102 of the housing 12 until the housing 104 contacts the adjustment collar 110. At this point, the first collar 38 may be inserted into the housing 12 at the first end 28 until the first collar 38 contacts the housing 104. The second collar 40 may subsequently be inserted into the housing 12 at the first end 28 and may engage the threads 36 of the housing 12 to secure the first collar 38, housing 104, and adjustment collar 110 in a desired position along the longitudinal axis 102 of the housing 12. Specifically, a rotational force may be applied to the second collar 40 at the cutouts 124 to facilitate rotation of the second collar 40 and, thus, concurrent translation of the second collar 40 in a direction along the longitudinal axis 102 and toward the first collar 38, housing 104, and adjustment collar 110.

The eyepiece lens 96 may be received at the second end 30 of the housing 12 and may engage a shoulder 188 (FIG. 6) to properly position the eyepiece lens 96 relative to the housing 12 in a direction along the longitudinal axis 102. Once the eyepiece lens 96 is in contact with the shoulder 188, the seal 100 may retain the eyepiece lens 96 in contact with the shoulder 188 prior to installation of the collar 44. The collar 44 may be inserted into the second end 30 of the housing 12 and may engage the threads 42 of the housing 12, thereby causing the collar 44 to translate in a direction substantially toward the adjustment collar 110 until the collar 44 contacts the eyepiece lens 96.

The controller 166 may be received within the opening 54 of the housing 12 and may be positioned to facilitate communication with the battery 76, photovoltaic cell 162, and LED 164. The controller 166 may be supported within the housing 12 by a fastener 190 (FIG. 6) and is hidden from view once the cover 58 is installed on the housing 12 via fasteners 60.

Once the assembly of the reflex sight 10 is complete and the illumination system 16 is capable of generating the illuminated aiming point 24 on the wedged, doublet objective lens 98, a position of the housing 104 along the longitudinal axis 102 of the housing 12 may be adjusted by rotating the adjustment collar 110. Specifically, a tool may be inserted into the groove 176 to rotate the adjustment collar 110 relative to the housing to move the housing toward or away from the eyepiece lens 96, as previously discussed.

Movement of the adjustment collar 110 likewise changes a position of the housing 104 along the longitudinal axis 102 and, thus, the position of the wedged, doublet objective lens 98 along the longitudinal axis 102. Such movement may be performed to account for component variation and/or tolerance stack up in an effort to minimize the parallax of the reflex sight 10. In short, allowing for adjustment of the collar 110 and housing 104 concurrently provides the sight 10 with the minimum possible amount of parallax and provides flexibility in manufacturing and assembly of the individual components of the reflex sight 10.

The second collar 40 must be removed or at least positioned closer to the first end 28 of the housing 12 prior to rotation of the adjustment collar 110 to provide sufficient clearance for the adjustment collar 110 to move toward the first end 28 of the housing 12 and effect likewise movement of the housing 104 and second collar 40. Once the adjustment collar 110 moves the housing 104 and, thus, the wedged, doublet objective lens 98 into a desired position along the longitudinal axis 102 of the housing 12, the second collar 40 may once again be moved generally toward the adjustment collar 110. The second collar 40 may once again be rotated relative to the housing 12 and moved into engagement with the first collar 38 along the longitudinal axis 102 to maintain engagement between the housing 104 and the adjustment collar 110, thereby fixing the position of the housing 104 relative to the housing 12.

Once the optics train 14 is installed in the housing 12 and the interior volume 32 is sealed, a threaded plug 182 may engage the threaded portion 90 of the port 86. Specifically, a rotational force may be applied to the threaded plug 182 to insert the plug 182 into the threaded portion 90 of the port 86. The threaded plug 182 may engage a seal 184 disposed generally between a distal end of the threaded plug 182 and the tapered end 92 of the port 86. Engagement between the threaded plug 182 and the seal 184 causes the seal 184 to engage the tapered end 92 of the port 86 and may cause the seal 184 to compress and completely seal an opening 196 of the bore 88.

In one configuration, the seal 184 includes a substantially spherical shape and may be formed from any resilient material. For example, the seal 184 may be a butadiene acrylonitrile rubber ball that is positioned within the port 86 prior to insertion of the threaded plug 182. Once the threaded plug 182 is inserted into the threaded portion 90, the butadiene acrylonitrile rubber ball engages the opening 196 of the bore 88 and is held in place due to the threadable engagement of the plug 182 and the port 86.

The threaded plug 182 may include a passage 198 formed therethrough that exposes a portion of the seal 184. During assembly, an injection needle (not shown) may be inserted into the passage 198 and may pierce the seal 184. Upon sufficient movement of the needle relative to the seal 184, the needle may pass through the seal 184 and be in fluid communication with the bore 88 proximate to the opening 196. At this point, the needle may be used to evacuate fluid from within the interior volume 32 of the housing 12 and/or to replace the evacuated fluid with nitrogen gas ($N_2$) or other dry, inert gas. Evacuating air from the interior volume 32 reduces moisture within the housing 12 while replacing the evacuated air with dry, inert gas eliminates fogging of the optics train 14 during use, thereby improving the visibility through the reflex sight 10.

Once the fluid and moisture is evacuated from the interior volume 32 and the interior volume 32 is filled with dry, inert gas, the needle may be removed from the seal 184 and from the passage 198. The dry, inert gas is not permitted to escape from the interior volume 32 via the bore 88, as the seal 184 is formed from a resilient material that automatically seals the bore 88 upon removal of the needle from the seal 184. Specifically, the resilient material of the seal 184 immediately closes any hole formed through the seal 184 by the needle during manufacturing and therefore maintains the sealed nature of the interior volume 32 of the housing 12.

Once assembled, the reflex sight 10 may be threadably attached to a mounting adaptor (not shown) via a series of threaded apertures 192 formed in the surface 56 of the housing 12. Once attached to the mounting adaptor, the reflex sight 10 may be positioned on a mating rail (not shown) associated with the firearm 20.

Upon installation of the reflex sight 10 to the firearm 20, calibration of the illumination system 16 and, thus, the illuminated aiming point 24 may be performed to properly align the illuminated aiming point 24 with a barrel (not shown) of the firearm 20. Specifically, a shooter may depress a button 180 disposed on a side surface of the housing 12 to energize the illumination system 16. Once energized, the buttons 180 may be depressed to control an amount of power supplied to the illumination system 16 to adjust a brightness of the aiming point 24.

As described above, power is supplied to the LED 164 from one or both of the photovoltaic cell 162 and the battery 76. The illumination system 16 may default to supplying power to the LED 164 from the photovoltaic cell 162 in an effort to conserve power stored by the battery 76. Power from the battery 76 may be used to supplement the power supplied by the photovoltaic cell 162 if ambient-light conditions are such that the photovoltaic cell 162 is incapable of providing sufficient power to the LED 164 to illuminate the aiming point 24 at a desired brightness.

The illuminated aiming point 24 is located generally within the field-of-view 26 and may be adjusted for elevation and windage to align the illuminated aiming point 24 with the barrel of the firearm 20. Specifically, a rotational force may be applied to the adjustment screw 140 of the adjustment mechanism 18 to move the adjuster block 136 and, thus, the support plate 157 and LED 164 in a direction (Z) to adjust the elevation of the illuminated aiming point 24 within the field-of-view 26. Additionally or alternatively, a rotational force may be applied to the adjustment screw 158 to move the support plate 157 and, thus, the LED 164 in the direction (X) to account for windage.

Movement of the support plate 157 relative to the housing 12 likewise causes movement of the LED 164 relative to the housing 12, thereby changing a position of the LED 164 relative to the wedged, doublet objective lens 98. Changing a position of the LED 164 relative to the wedged, doublet objective lens 98 likewise causes the position at which light from the LED 164 contacts the reflective coating 132 of the wedged, doublet objective lens 98 and, therefore, changes a position of the illuminated aiming point 24 within the field-of-view 26.

The direction (Z) is substantially parallel to an angle (⊖) of the wedged, doublet objective lens 98 and is substantially perpendicular to the direction of light travel from the LED 164. Therefore, when the adjuster block 136 moves in the direction (Z), the LED 164 not only moves in the direction (Z) along with the adjuster block 136 and support plate 157 but, also, moves in a direction substantially parallel to the angle (⊖) of the wedged, doublet objective lens 98.

The intensity of the illumination of the illuminated aiming point 24 may be adjusted by depressing one or more of the buttons 180 located substantially at side surfaces of the housing 12. Specifically, the controller 166 may be in communication with the buttons 180 such that when the buttons 180 are depressed, the controller 166 adjusts the amount of power supplied to the LED 164, thereby causing the light generated by the LED 164 to be increased or decreased based on user input.

Once the shooter is satisfied that the illuminated aiming point 24 is aligned with the barrel of the firearm 20, the position of the support plate 157 and, thus, the LED 164 relative to the housing 12, is maintained due to the forces exerted on the adjuster block 136 and slider blocks 156 via the biasing elements 138, 160, in cooperation with the adjustment screws 140, 158.

The field-of-view 26 may be achieved by a clear aperture of a diameter substantially equal to 28 mm, thereby providing the shooter with a large opening within which to view a target. The large field-of-view is accomplished by providing the wedged, doublet objective lens 98 having first and second lenses 126, 128 that each include a different amount of wedge, a different radii of curvature (R2, R4), and different refractive indices. Further, placement of the lenses 126, 128 a short distance from the eyepiece lens 96 also provides for the increased size of the field-of-view 26. In short, the foregoing properties of the wedged, doublet objective lens 98 allow the lens 98 to be angled to a greater extent (i.e., having a small angle of tilt (Θ) relative to the longitudinal axis 102; FIGS. 5 and 6), thereby allowing a short focal length without increasing parallax.

Shortening the focal length of the optical axis 134 likewise shortens the optics train 14, which minimizes the overall size of the housing 12 and, thus, the reflex sight 10. More specifically, because parallax is a function of lens tilt (i.e., lens angle) and focal length, as the focal length decreases in an effort to reduce the length of the optics train 14 and, thus, the size of the housing 12, the wedged, doublet objective lens 98 of the optics train 14 is required to tilt more (i.e., the angle (Θ) is required to be smaller relative to the longitudinal axis 102). The decreased angle (Θ) of the wedged, doublet objective lens 98 typically would result in an increase in parallax. However, because the wedged, doublet objective lens 98 includes a first lens 126 and a second lens 128 having a different amount of wedge, different radii of curvature, and different refractive indices and, further, because each lens 126, 128 is off-centered from the optical axis 134, the amount of parallax of the reflex sight 10 can be maintained at a level comparable to customary spherical-lens optics that have substantially longer focal lengths, optical trains, and overall sight lengths.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An optical sight comprising:
   a housing;
   an optics train supported by said housing;
   an illumination device operable to selectively display an aiming point on said optics train, wherein said illumination device is operable to direct light toward an optic of said optics train in a direction substantially perpendicular to said optic to generate said aiming point, said illumination device being slidably supported by an adjuster block relative to said housing, said adjuster block movable relative to said housing in a first direction substantially parallel to said optic;
   a power source including a photovoltaic cell and a battery, said power source selectively supplying power from at least one of said photovoltaic cell and said battery to said illumination device for use by said illumination device in generating said aiming point, said illumination device providing as much power as available from said photovoltaic cell prior to supplying power from said battery.

2. The optical sight of claim 1, wherein said illumination device supplies power from said photovoltaic cell until power from said photovoltaic cell falls below a demand voltage required by said illumination device.

3. The optical sight of claim 2, wherein said illumination device supplies power from said battery to supplement said power supplied by said photovoltaic cell when said power from said photovoltaic cell falls below said demand voltage.

4. The optical sight claim 1, wherein said optics train includes at least one optic, said at least one optic movable along a longitudinal axis of said housing.

5. The optical sight of claim 4, wherein said at least one optic is slidably supported within said housing by a optic housing.

6. The optical sight of claim 1, wherein said illumination device is fixed for movement with said adjuster block in said first direction and is movable relative to said adjuster block in a second direction.

7. The optical sight of claim 6, wherein said second direction is substantially perpendicular to a longitudinal axis of said housing.

8. The optical sight of claim 6, wherein said second direction is substantially parallel to a back surface of said housing.

9. The optical sight of claim 6, wherein said second direction is substantially perpendicular to said first direction.

10. The optical sight of claim 1, wherein said adjuster block includes a first end supporting said illumination device and a second end operatively attached to said housing.

11. The optical sight of claim 10, further comprising a biasing element disposed between said first end and said second end.

12. The optical sight of claim 11, wherein said biasing element applies a force on said adjuster block in a direction substantially parallel to said first direction.

13. The optical sight of claim 11, wherein said biasing element is received within a blind bore formed in said adjuster block.

14. The optical sight of claim 10, wherein said second end includes a threaded bore that receives an adjustment screw therein, said adjustment screw operable to selectively move said adjuster block relative to said housing in said first direction when said adjustment screw is rotated relative to said housing.

15. The optical sight of claim 1, further comprising a pair of slider blocks supported by said housing and operable to guide movement of said adjuster block in said first direction.

16. The optical sight of claim 15, wherein said pair of slider blocks each include a threaded aperture that receives an adjustment screw therein, said adjustment screws operable to move said slider blocks in a second direction perpendicular to said first direction when said adjustment screws are rotated relative to said housing.

17. The optical sight of claim 16, wherein movement of said slider blocks in said second direction causes movement of said illumination device in said second direction relative to said adjuster block.

18. The optical sight of claim 15, wherein said pair of slider blocks each include a groove that guides movement of said illumination device in said first direction.

* * * * *